US008953881B2

(12) United States Patent
Lai et al.

(10) Patent No.: US 8,953,881 B2
(45) Date of Patent: Feb. 10, 2015

(54) IMAGE PROCESSING APPARATUS AND IMAGE PROCESSING METHOD

(75) Inventors: Ching-Hao Lai, Taichung County (TW); Chia-Chen Yu, Taoyuan (TW); Ping-Hsien Lin, Yonghe (TW)

(73) Assignee: Institute for Information Industry, Taipei (TW)

(*) Notice: Subject to any disclaimer, the term of this patent is extended or adjusted under 35 U.S.C. 154(b) by 1013 days.

(21) Appl. No.: 12/958,076

(22) Filed: Dec. 1, 2010

(65) Prior Publication Data

US 2012/0114266 A1    May 10, 2012

(30) Foreign Application Priority Data

Nov. 5, 2010 (TW) .............................. 99138117 A

(51) Int. Cl.
*G06K 9/00* (2006.01)
*G06K 9/40* (2006.01)
*G06T 5/40* (2006.01)
*G06T 5/00* (2006.01)

(52) U.S. Cl.
CPC .. *G06T 5/40* (2013.01); *G06T 5/009* (2013.01)
USPC ............................. 382/168; 382/167; 382/274

(58) Field of Classification Search
None
See application file for complete search history.

(56) References Cited

U.S. PATENT DOCUMENTS 5,662,113 A * 9/1997 Liu ................................ 600/443
7,158,687 B2 * 1/2007 Ohno ............................ 382/274
2002/0006231 A1 * 1/2002 Jayant et al. .................. 382/266
2004/0001639 A1 * 1/2004 Ohno ............................ 382/254
2007/0040929 A1 * 2/2007 Ohno ............................ 348/362
2008/0304695 A1   12/2008 Holm et al.

FOREIGN PATENT DOCUMENTS

EP         1 482 447 A1     12/2004

OTHER PUBLICATIONS

Fitzgerald, M.—"Speckle statistics in adaptively corrected images"—The Astrophysical Journal, 637; pp. 541-547, Jan. 2006.*

* cited by examiner

*Primary Examiner* — Bernard Krasnic
(74) *Attorney, Agent, or Firm* — Ping Wang; Andrews Kurth LLP

(57) ABSTRACT

An image processing apparatus and an image processing method are provided. A storage unit of the image processing apparatus stores an image and a piece of intensity statistical information of the image. The piece of intensity statistical information records that the image has a first number of pixels having a first intensity value, a second number of pixels having a second intensity value, and a third number of pixels having a third intensity value. A micro-processing unit of the image processing unit calculates a centralization degree of the second intensity value in the image according to the first number, the second number, and the third number. If the centralization degree is greater than a threshold, the micro-processing unit adjusts the intensity value of a pixel having the second intensity value in the image according to the second intensity value and the intensity value of the at least one neighboring pixel of the pixel.

18 Claims, 3 Drawing Sheets

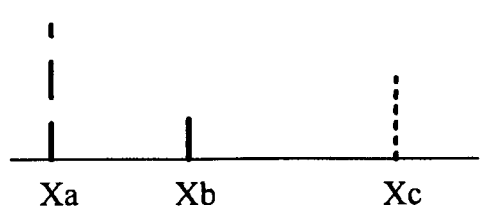
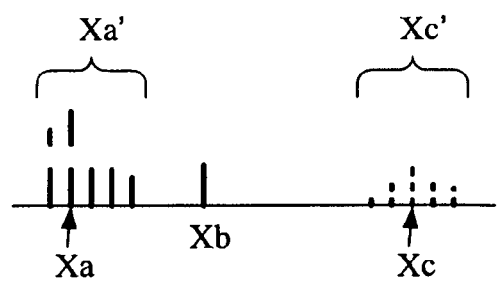
FIG. 2A  FIG. 2B
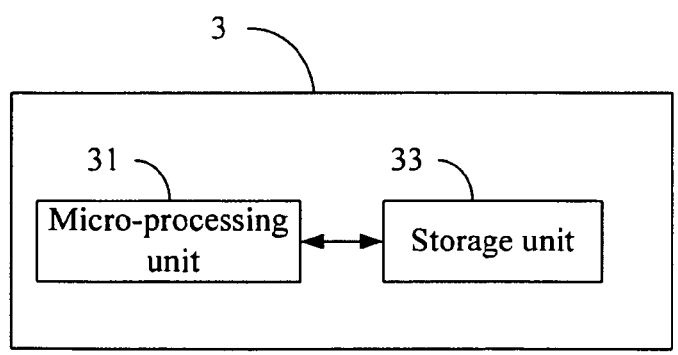
FIG. 3

IMAGE PROCESSING APPARATUS AND IMAGE PROCESSING METHOD

This application claims priority to Taiwan Patent Application No. 099138117 filed on Nov. 5, 2010, which is hereby incorporated by reference in its entirety.

FIELD

The present invention relates to an image processing apparatus and an image processing method; more particularly, the present invention relates to an image processing apparatus and an image processing method for processing a quantized image.

BACKGROUND

Nowadays, electronic products developed by many manufacturers have a built-in camera module in order to attract consumers. Unfortunately, photoelectronic components equipped in many camera modules are not of good quality, so when they are used by users to take a photograph in poor lighting conditions, the generated image usually presents a very low contrast ratio. To process an image with a low contrast ratio, post-processing technologies have been adopted by many people. Among such post-processing technologies, the most commonly adopted one is the histogram equalization processing technology, which scatters intensity values of the image.

FIG. 1A depicts an image with a low contrast ratio, while FIG. 1B depicts a histogram of the image of FIG. 1A. FIG. 1C depicts an image obtained by processing the image of FIG. 1A through histogram equalization, while FIG. 1D depicts a histogram obtained by processing the histogram of FIG. 1B through equalization. As can be seen from FIG. 1C and FIG. 1D, although the image presents a higher contrast ratio after being applied histogram equalization, a phenomenon of histogram quantization (i.e., discontinuity of intensities) is caused.

In fact, in addition to images processed through histogram quantization, the problem of quantization may also occur to histograms of some images that haven't been post-processed. Therefore, efforts still have to be made in the art to solve this problem.

SUMMARY

An objective of the present invention is to provide an image processing apparatus. The image processing apparatus comprises a storage unit and a micro-processing unit. The storage unit is configured to store an image and a piece of intensity statistical information of the image. The piece of intensity statistical information records that the image has a first number of pixels having a first intensity value, a second number of pixels having a second intensity value, and a third number of pixels having a third intensity value. The first intensity value is smaller than the second intensity value, the third intensity value is greater than the second intensity value, and the second number is greater than zero. The micro-processing unit is configured to calculate a centralization degree of the second intensity value in the image according to the first number, the second number, and the third number. The micro-processing unit is further configured to determine that the centralization degree is greater than a threshold. After determining that the centralization degree is greater than the threshold, the micro-processing unit calculates an adjustment value for a pixel having the second intensity value in the image according to the second intensity value and an intensity values of at least one neighboring pixel of the pixel. Then the micro-processing unit adjusts the second intensity value of the pixel to a fourth intensity value according to the adjustment value.

Another objective of the present invention is to provide an image processing method, which is adapted for an image processing apparatus comprising a micro-processing unit and a storage unit. The storage unit is configured to store an image and a piece of intensity statistical information of the image. The piece of intensity statistical information records that the image has a first number of pixels having a first intensity value, a second number of pixels having a second intensity value, and a third number of pixels having a third intensity value. The first intensity value is smaller than the second intensity value, the third intensity value is greater than the second intensity value, and the second number is greater than zero. The image processing method comprises the following steps of: (a) enabling the micro-processing unit to calculate a centralization degree of the second intensity value in the image according to the first number, the second number, and the third number; (b) enabling the micro-processing unit to determine that the centralization degree is greater than a threshold; (c) enabling the micro-processing unit to calculate an adjustment value for a pixel having the second intensity value in the image according to the second intensity value and an intensity values of at least one neighboring pixel of the pixel; and (d) enabling the micro-processing unit to adjust the second intensity value of the pixel to a fourth intensity value according to the adjustment value.

According to the above descriptions, the image processing apparatus and the image processing method of the present invention analyze a centralization degree of an intensity value in an image according to a piece of intensity statistical information of the image. If the centralization degree is greater than a threshold, it means that the intensity value has a high centralization degree. Accordingly, the image processing apparatus and the image processing method of the present invention will further process the pixel having this intensity value in the image; that is, the image processing apparatus and the image processing method will calculate an adjustment value according to the intensity value of the pixel and intensity values of its neighboring pixels so as to adjust the intensity value of the pixel. With arrangement of the present invention, an intensity value having a high centralization degree will be appropriately adjusted, so the problem with the prior art that intensity statistical information (e.g., histograms) of an image is unduly quantized can be solved.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 2A depicts a part of a histogram of an image;
FIG. 2B depicts a part of the histogram after being processed according to the present invention;
FIG. 3 depicts a schematic view of internal components of an image processing apparatus according to a first embodiment.

DESCRIPTION OF THE PREFERRED EMBODIMENT

Figure 1C:
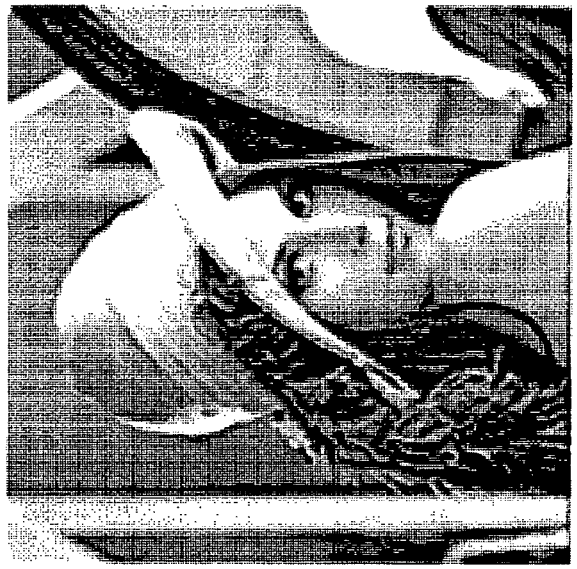
FIG. 1C depicts an image obtained by processing the image of FIG. 1A through histogram equalization.
Figure 1D:
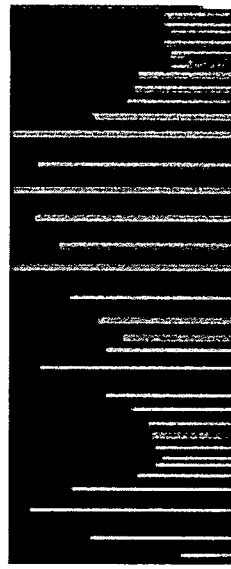
FIG. 1D depicts a histogram obtained by processing the histogram of FIG. 1B through equalization.
Figure 1A:
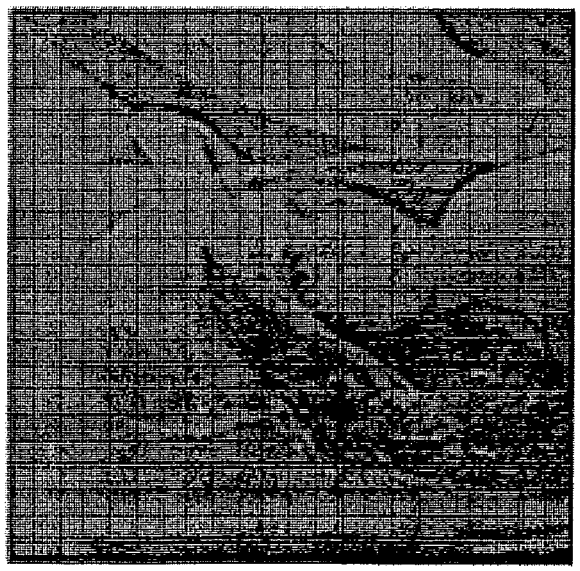
FIG. 1A depicts an image having a low contrast ratio.
Figure 1B:
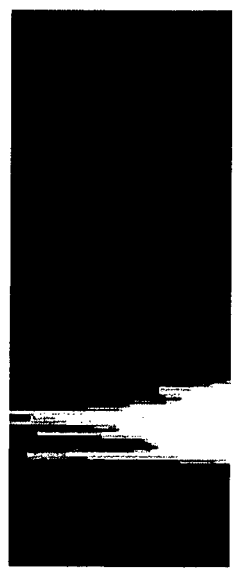
FIG. 1B depicts a histogram of the image of FIG. 1A.

In the following description, the present invention will be explained with reference to embodiments thereof. However, these embodiments are not intended to limit the present invention to any specific environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction.

The present invention is intended to process an image whose intensity statistical information (e.g., histogram) suffers from the quantization phenomenon, so as to render intensity values relatively dispersed in the processed image to obtain an image that presents a more natural appearance and a higher contrast ratio. As described in the BACKGROUND OF THE INVENTION, quantization of intensity statistical information may occur to many images, but usually it occurs to images that have been processed through histogram equalization.

Firstly, concepts of the present invention will be explained with reference to FIG. 2A and FIG. 2B. FIG. 2A depicts a part of a histogram of an image, and FIG. 2B depicts a part of the histogram after being processed according to the present invention. In FIG. 2A and FIG. 2B, the horizontal axis represents intensity values of the image, and the vertical axis represents the number of pixels. From FIG. 2A, the number of pixels having an intensity value Xa, the number of pixels having an intensity value Xb, and the number of pixels having an intensity value Xc in the image can be known. Since several intensity values between the intensity value Xa and the intensity value Xb as well as several intensity values between the intensity value Xb and the intensity value Xc correspond to zero pixels, the quantization phenomenon occurs partially to the histogram of FIG. 2A. The present invention analyzes the number of pixels of the intensity values Xa, Xb, and Xc, individually. If the analysis result of an intensity value reveals that the intensity value has a high centralization degree, the present invention will further analyze pixels having this intensity value in the image and then adjust the intensity value of the pixels. On the contrary, if the analysis result of an intensity value reveals that the intensity value has a low centralization degree, then the present invention will not make any analysis and adjustment on pixels having this intensity value in the image.

Assuming that the analysis result reveals that the intensity values Xa and Xc have a high centralization degree, then the present invention makes further analysis and adjustment on pixels having the intensity value Xa and pixels having the intensity value Xc in the image. After the pixels having the intensity value Xa in the image have been processed, the adjusted intensity values of these pixels and the corresponding numbers of pixels are as shown by the intensity value Xa' in FIG. 2B. Similarly, after the pixels having the intensity value Xc in the image have been processed, the adjusted intensity values of these pixels and the corresponding numbers of pixels are as shown by the intensity value Xc' in FIG. 2B. On the other hand, assuming that the analysis result reveals that the intensity value Xb has a low centralization degree, then the present invention will not make any analysis and adjustment on pixels having this intensity value, so the intensity value of these pixels and the number of pixels remain unchanged as shown in FIG. 2B.

A first embodiment of the present invention is an image processing apparatus 3, whose internal components are schematically depicted in FIG. 3. The image processing apparatus 3 comprises a micro-processing unit 31 and a storage unit 33. The micro-processing unit 31 may be any of various processors, central processing units (CPUs), microprocessors, or other computing devices which are well-known to those of ordinary skill in the art. The storage unit 33 may be a memory, a floppy disk, a hard disk, a compact disk (CD), a mobile disk, a magnetic tape, a database accessible to networks, or any other storage media with the same function and well-known to those of ordinary skill in the art.

The storage unit 33 is configured to store an image and a piece of intensity statistical information of this image. As an example, the piece of intensity statistical information may be a histogram of this image. For each intensity value in the image, the piece of intensity statistical information records a number of pixels having that intensity value. Assuming that the intensity values of this image ranges from 0 and 255, then the piece of intensity statistical information records the number of pixels having the intensity value 0 to the number of pixels having the intensity value 255. This is well-known to those of ordinary skill in the art, so no further description will be made herein.

The micro-processing unit 31 will make subsequent processing on each intensity value corresponding to a non-zero pixel number, which will be described now with an intensity value 128 as an example. For the intensity value 128, the micro-processing unit 31 chooses two intensity values, one of which is smaller than the intensity value 128 (e.g., an intensity value 127) and the other is greater than the intensity value 128 (e.g., an intensity value 129). Hereinafter, the intensity value 127, the intensity value 128, and the intensity value 129 will be denoted as the first intensity value, the second intensity value, and the third intensity value respectively. The piece of intensity statistical information records that the image has a first number of pixels having the first intensity value, a second number of pixels having the second intensity value, and a third number of pixels having the third intensity value, wherein the second number is greater than zero.

Then, the micro-processing unit 31 calculates a centralization degree of the second intensity value in the image according to the first number, the second number, and the third number. For example, the micro-processing unit 31 may calculate the centralization degree according to Formula (1) below:

$$D_S = \text{Max}(|I_{S-1} - I_S|, |I_{S+1} - I_S|) \tag{1}$$

where the parameter S represents the intensity value (i.e., the second intensity value) that is currently being processed, the parameter $D_S$ represents the centralization degree of the second intensity value, S−1 represents the first intensity value, the parameter $I_{S-1}$ represents the first number, the parameter $I_S$ represents the second number, S+1 represents the third intensity value, the parameter $I_{S+1}$ represents the third number, and the function Max( ) represents the function of choosing a maximum.

Next, the micro-processing unit 31 compares the centralization degree with a threshold. If the micro-processing unit 31 determines that the centralization degree of the second intensity value is not greater than the threshold, it means that the second intensity value is not a centralized one. Therefore, the micro-processing unit 31 will not make any process on pixels having the second intensity value. Conversely, if the micro-processing unit 31 determines that the centralization degree of the second intensity value is greater than the threshold, it means that the second intensity value is a centralized one. Thus, the micro-processing unit 31 will make further process on pixels having the second intensity value in the image.

Now, with reference to a pixel having the second intensity value, how the micro-processing unit 31 operates when the centralization degree of the second intensity value is greater than the threshold will be detailed. The micro-processing unit 31 calculates an adjustment value for the pixel according to the intensity value (i.e., the second intensity value) of the pixel and an intensity value of each of at least one neighboring pixel of the pixel, and then adjusts the second intensity value of the pixel to a fourth intensity value according to the adjustment value. Hereinbelow, two exemplary examples of calculating and applying the adjustment value will be provided.

In a first example, the micro-processing unit 31 determines if the pixel is located at an edge of an object in the image according to the intensity value of the pixel and those of the neighboring pixels. How to determine if a pixel is located at an edge of an object in an image is well-known to persons skilled in the art, so no further description will be made herein. If the pixel is located at an edge of an object in the image, then the micro-processing unit 31 assigns a negative value as the adjustment value. Afterwards, the micro-processing unit 31 adjusts the second intensity value of the pixel to a fourth intensity value according to the adjustment value, wherein the fourth intensity value is smaller than the second intensity value. Conversely, if the pixel is not located at an edge of an object in the image, then the micro-processing unit 31 assigns a positive value as the adjustment value. Then, the micro-processing unit 31 adjusts the second intensity value of the pixel to the fourth intensity value according to the adjustment value, wherein the fourth intensity value is greater than the second intensity value.

In a second exemplary example, the micro-processing unit 31 calculates an average intensity value according to the intensity value of the pixel (i.e., the second intensity value) and those of the neighboring pixels. Next, the micro-processing unit 31 determines if the intensity value (i.e., the second intensity value) of the pixel is greater than the average intensity value. If the intensity value of the pixel is greater than the average intensity value, then the micro-processing unit 31 assigns a positive value as the adjustment value. Afterwards, the micro-processing unit 31 adjusts the second intensity value of the pixel to the fourth intensity value according to the adjustment value, wherein the fourth intensity value is greater than the second intensity value. Conversely, if the intensity value of the pixel is not greater than the average intensity value, then the micro-processing unit 31 assigns a negative value as the adjustment value. Then, the micro-processing unit 31 adjusts the second intensity value of the pixel to the fourth intensity value according to the adjustment value, wherein the fourth intensity value is smaller than the second intensity value.

In these two exemplary examples, the micro-processing unit 31 may adjust the second intensity value of the pixel to the fourth intensity value according to the adjustment value, a standard deviation, and a Gaussian random number. For example, the fourth intensity value may be calculated according to Formula (2) below:

$$g(Z)=f(Z)+W(f(Z),Z)(\sigma_S \times \text{Gaussian}(0,1)) \quad (2)$$

where the parameter Z represents the pixel that is currently being processed, $f(Z)$ represents an intensity value of the pixel Z in the image (i.e., the second intensity value), $W(f(Z),Z)$ represents the adjustment value of the pixel Z, the parameter $\sigma_S$ represents the standard deviation, Gaussian( ) represents a normalized Gaussian random number derived according to a Gaussian distribution, and $g(Z)$ represents the intensity value of the pixel Z after being adjusted (i.e., the fourth intensity value). In some examples, the standard deviation may be set to be correlated with (e.g., directly proportional to) the aforesaid centralization degree. Hence, when the aforesaid formula is adopted to adjust the intensity value of the pixel, the adjustment value may be considered as a weight of the Gaussian random number. If the adjustment value is a positive value, then the fourth intensity value is greater than the second intensity value; conversely, if the adjustment value is a negative value, then the fourth intensity value is smaller than the second intensity value.

It is noted that the above two examples showing how the adjustment value is calculated and applied are not intended to limit scope of the present invention. Additionally, in the aforesaid calculation of the centralization degree of the second intensity value, a difference between the first intensity value and the second intensity value and a difference between the second intensity value and the third intensity value are both one; however, in other examples, the difference between the first intensity value and the second intensity value and the difference between the second intensity value and the third intensity value may be other numerical values. Furthermore, in other embodiments of the present invention, the centralization degree of the second intensity value may also be calculated according to more intensity values.

Through the arrangement and operations described above, the image processing apparatus 3 of the first embodiment can make processing on an intensity value having a high centralized value, thereby solving the problem of quantization occurring to intensity statistical information of the image.

Figure 4:
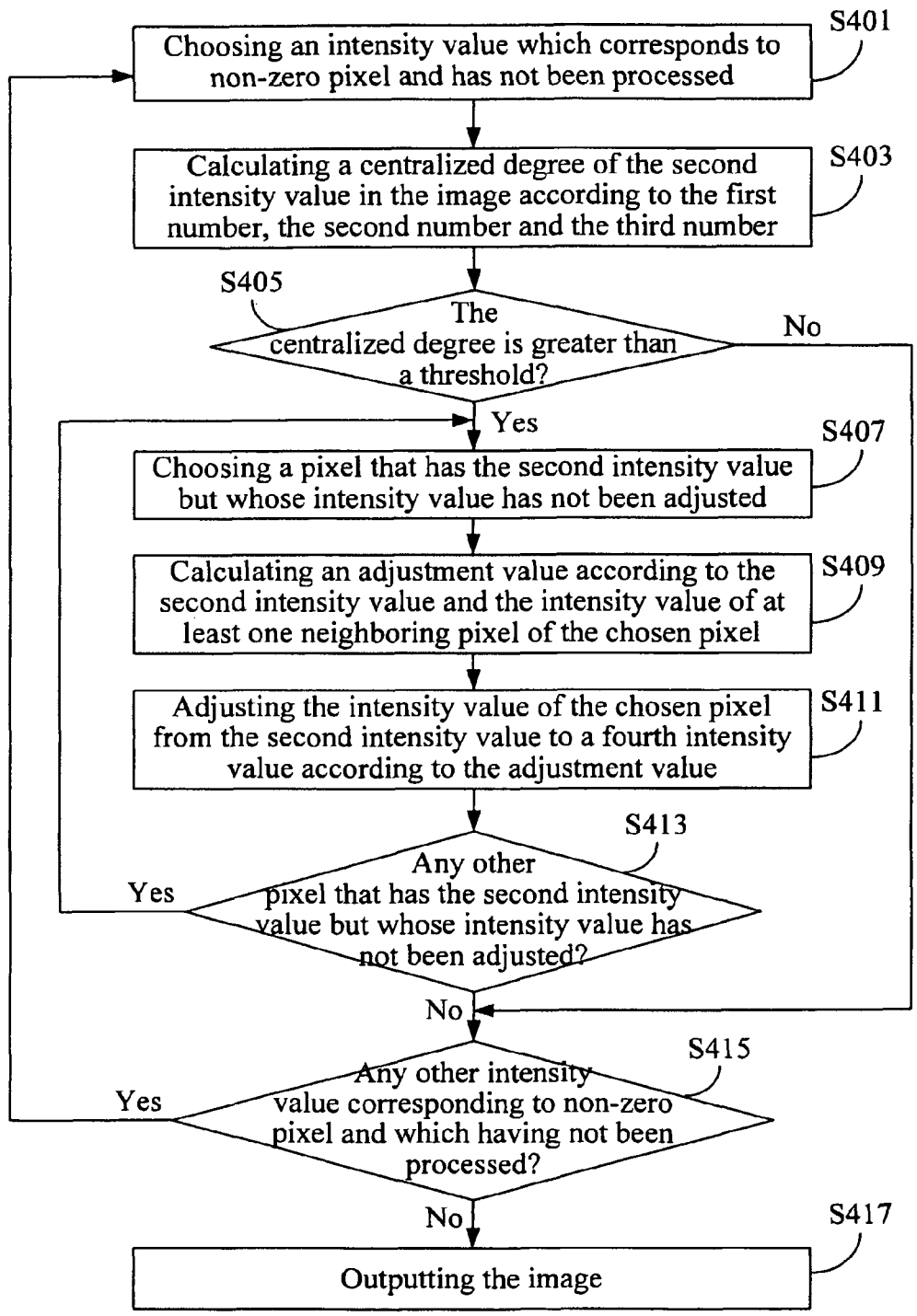
FIG. 4 depicts a flowchart of an image processing method according to a second embodiment.

A second embodiment of the present invention is an image processing method, whose flowchart is depicted in FIG. 4. The image processing method is adapted for an image processing apparatus comprising a micro-processing unit and a storage unit, e.g., the image processing apparatus 3 of the first embodiment. The storage unit is configured to store an image and a piece of intensity statistical information of the image. For each intensity value in the image, the piece of intensity statistical information records a number of pixels having that intensity value. Assuming that the intensity values of pixels in the image ranges from 0 to 255, then the piece of intensity statistical information records the number of pixels having the intensity value 0 to the number of pixels having the intensity value 255 in the image. This has been well-known to those of ordinary skill in the art, so no further description will be made herein.

Initially, the image processing method executes step S401 to enable the micro-processing unit to choose an intensity value which corresponds to non-zero pixel and has not been processed. For convenience of the following description, the intensity value chosen in step S401 is denoted as a second intensity value. For the second intensity value, the image processing method sets a first intensity value and a third intensity value. The first intensity value is smaller than the second intensity value, and the third intensity value is greater than the second intensity value. The piece of intensity statistical information records that the image has a first number of pixels having the first intensity value, a second number of pixels having the second intensity value, and a third number of pixels having the third intensity value. Here, the second number is greater than zero.

Then, step S403 is executed to enable the micro-processing unit to calculate a centralization degree of the second intensity value in the image according to the first number, the second number, and the third number. Next, step S405 is executed to determine if the centralization degree is greater than a threshold. If the determination result of the step S405 is "no", then the image processing method proceeds to step S415. Operations of step S415 will be described later.

Otherwise, if the determination result of step S405 is "yes", then step S407 to step S413 are executed to process each of the pixels having the second intensity value but having not been processed in the image. In more details, step S407 is executed to enable the micro-processing unit to choose a pixel that has the second intensity value but whose intensity value has not been adjusted from the image. Next, step S409 is executed to calculate an adjustment value for the chosen pixel according to the intensity value (i.e., the second intensity value) of the chosen pixel and an intensity value of each of at least one neighboring pixel of the chosen pixel.

Further speaking, the image processing method can calculate the adjustment value of the pixel in several different ways. As an example, step S409 may enable the micro-processing unit to determine if the chosen pixel is located at an edge of an object in the image according to the intensity value (i.e., the second intensity value) of the chosen pixel and the intensity values of the at least one neighboring pixel of the chosen pixel. If the pixel is located at an edge of an object in the image, then in step S409, the micro-processing unit assigns a negative value as the adjustment value; otherwise, if the pixel is not located at an edge of an object in the image, then the micro-processing unit assigns a positive value as the adjustment value. As another example, step S409 may enable the micro-processing unit to calculate an average intensity value according to the intensity value (i.e., the second intensity value) of the chosen pixel and the intensity values of the at least one neighboring pixel of the chosen pixel, and then determines if the second intensity value is greater than the average intensity value. If the second intensity value is greater than the average intensity value, then in step S409, the micro-processing unit assigns a positive value as the adjustment value; otherwise, if the second intensity value is not greater than the average intensity value, then the micro-processing unit assigns a negative value as the adjustment value.

Subsequent to S409, step S411 is executed to adjust the intensity value of the pixel from the second intensity value into a fourth intensity value according to the adjustment value. When the adjustment value is a negative value, then the fourth intensity value is smaller than the second intensity value; otherwise, if the adjustment value is a positive value, then the fourth intensity value is greater than the second intensity value. For example, in step S411, the intensity value of the pixel may be adjusted from the second intensity value into the fourth intensity value according to Formula (2) above.

Afterwards, step S413 is executed to determine if there is still any pixel that has the second intensity value but whose intensity value has not been adjusted. If the determination result of step S413 is "yes", then the image processing method proceeds to step S407; otherwise, if the determination result of step S413 is "no", then the image processing method proceeds to step S415.

Step S415 is executed to enable the micro-processing unit to determine if there is still another intensity value which corresponds to no-zero pixel and which has not been processed. If the determination result of step S415 is "yes", then the image processing method proceeds to step S401; otherwise, the image processing method proceeds to step S417 to output the image.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

According to the above descriptions, the image processing apparatus and the image processing method of the present invention analyze a centralization degree of an intensity value in an image according to a piece of intensity statistical information of the image. If the centralization degree is greater than a threshold, it means that the intensity value has a high centralization degree. Accordingly, for a pixel having this intensity value in the image, the image processing apparatus and the image processing method of the present invention calculate an adjustment value according to the intensity value of the pixel and intensity values of its neighboring pixel(s) so as to adjust the intensity value of the pixel. With arrangement of the present invention, an intensity value having a high centralization degree will be appropriately adjusted, so the problem with the prior art that intensity statistical information of an image is unduly quantized can be solved.

The above disclosure is related to the detailed technical contents and inventive features thereof People skilled in this field may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. An image processing apparatus, comprising:
    a memory device, being configured to store an image and a piece of intensity statistical information of the image, wherein the piece of intensity statistical information records that the image has a first number of pixels having a first intensity value, a second number of pixels having a second intensity value, and a third number of pixels having a third intensity value, the first intensity value is smaller than the second intensity value, the third intensity value is greater than the second intensity value, and the second number is greater than zero; and
    a micro-processor, being electrically connected to the memory device and configured to calculate a centralization degree of the second intensity value in the image according to the first number, the second number, and the third number,
    wherein when the micro-processor determines that the centralization degree is greater than a threshold, the micro-processor then calculates an adjustment value for a pixel having the second intensity value in the image according to the second intensity value and an intensity value of at least one neighboring pixel of the pixel, and adjusts the second intensity value of the pixel to a fourth intensity value according to the adjustment value, and
    wherein when the micro-processor determines that the centralization degree is not greater than the threshold, the pixels having the second intensity value in the image are not adjusted.

2. The image processing apparatus as claimed in claim 1, wherein the micro-processor determines that the pixel is located at an edge of an object in the image according to the second intensity value and the intensity value of the at least one neighboring pixel, the micro-processor assigns a negative value as the adjustment value after determining that the pixel is located at the edge of the object in the image, and the fourth intensity value is smaller than the second intensity value.

3. The image processing apparatus as claimed in claim 1, wherein the micro-processor determines that the pixel is not located at an edge of an object in the image according to the second intensity value and the intensity value of the at least one neighboring pixel, micro-processor assigns a positive value as the adjustment value after determining that the pixel is not located at the edge of the object in the image, and the fourth intensity value is greater than the second intensity value.

4. The image processing apparatus as claimed in claim 1, wherein the micro-processor calculates an average intensity value according to the second intensity value and the intensity value of the at least one neighboring pixel, the micro-processor determines that the second intensity value is greater than the average intensity value, the micro-processor assigns a positive value as the adjustment value after determining that the second intensity value is greater than the average intensity value, and the fourth intensity value is greater than the second intensity value.

5. The image processing apparatus as claimed in claim 1, wherein the micro-processor calculates an average intensity value according to the second intensity value and the intensity value of the at least one neighboring pixel, the micro-processor determines that the second intensity value is not greater than the average intensity value, the micro-processor assigns a negative value as the adjustment value after determining that the second intensity value is not greater than the average intensity value, and the fourth intensity value is smaller than the second intensity value.

6. The image processing apparatus as claimed in claim 1, wherein the micro-processor adjusts the second intensity value of the pixel according to the adjustment value and a Gaussian random number.

7. The image processing apparatus as claimed in claim 6, wherein the micro-processor uses the adjustment value as a weight of the Gaussian random number.

8. The image processing apparatus as claimed in claim 1, wherein the micro-processor adjusts the second intensity value of the pixel according to the adjustment value, a standard deviation, and a Gaussian random number, and the standard deviation is correlated with the centralization degree.

9. The image processing apparatus as claimed in claim 1, wherein the piece of intensity statistical information is a histogram of the image.

10. An image processing method for an image processing apparatus, the image processing apparatus comprising a micro-processor and a memory device, the memory device storing an image and a piece of intensity statistical information of the image, the piece of intensity statistical information of the image recording that the image has a first number of pixels having a first intensity value, a second number of pixels having a second intensity value, and a third number of pixels having a third intensity value, the first intensity value being smaller than the second intensity value, the third intensity value being greater than the second intensity value, the second number being greater than zero, and the image processing method comprising the following steps of:
enabling the micro-processor to calculate a centralization degree of the second intensity value in the image according to the first number, the second number, and the third number;
enabling the micro-processor to determine that if the centralization degree is greater than a threshold:
enabling the micro-processor to then calculate an adjustment value for a pixel having the second intensity value in the image according to the second intensity value and an intensity value of at least one neighboring pixel of the pixel, and
enabling the micro-processor to adjust the second intensity value of the pixel to a fourth intensity value according to the adjustment value; and
enabling the micro-processor to determine that if the centralization degree is not greater than the threshold, the pixels having the second intensity value in the image are not adjusted.

11. The image processing method as claimed in claim 10, wherein the step of enabling the micro-processor to calculate the adjustment value of the pixel comprises the following steps of:
enabling the micro-processor to determine that the pixel is located at an edge of an object in the image according to the second intensity value and the intensity value of the at least one neighboring pixel; and
enabling the micro-processor to assign a negative value as the adjustment value;
wherein the fourth intensity value is smaller than the second intensity value.

12. The image processing method as claimed in claim 10, wherein the step of enabling micro-processor to calculate the adjustment value of the pixel comprises the following steps of:
enabling the micro-processor to determine that the pixel is not located at an edge of an object in the image according to the second intensity value and the intensity value of the at least one neighboring pixel; and
enabling the micro-processor to assign a positive value as the adjustment value;
wherein the fourth intensity value is greater than the second intensity value.

13. The image processing method as claimed in claim 10, wherein the step of enabling the micro-processor to calculate the adjustment value of the pixel comprises the following steps of:
enabling the micro-processor to calculate an average intensity value according to the second intensity value and the intensity value of the at least one neighboring pixel;
enabling the micro-processor to determine that the second intensity value is greater than the average intensity value; and
enabling the micro-processor to assign a positive value as the adjustment value;
wherein the fourth intensity value is greater than the second intensity value.

14. The image processing method as claimed in claim 10, wherein the step of enabling the micro-processor to calculate the adjustment value of the pixel comprises the following steps of:
enabling the micro-processor to calculate an average intensity value according to the second intensity value and the intensity value of the at least one neighboring pixel;
enabling the micro-processor to determine that the second intensity value is not greater than the average intensity value; and
enabling the micro-processor to assign a negative value as the adjustment value;
wherein the fourth intensity value is smaller than the second intensity value.

15. The image processing method as claimed in claim 10, wherein the step of enabling the micro-processor to adjust the second intensity value of the pixel is to enable the micro-processor to adjust the second intensity value of the pixel according to the adjustment value and a Gaussian random number.

16. The image processing method as claimed in claim 15, wherein the step of enabling the micro-processor to adjust the second intensity value of the pixel is to enable the micro-processor to use the adjustment value as a weight of the Gaussian random number.

17. The image processing method as claimed in claim 10, wherein the step of enabling the micro-processor to adjust the second intensity value of the pixel is to enable the micro-processor to adjust the second intensity value of the pixel according to the adjustment value, a standard deviation, and a Gaussian random number, and the standard deviation is correlated with the centralization degree.

18. The image processing method as claimed in claim 10, wherein the piece of intensity statistical information is a histogram of the image.

* * * * *